United States Patent
Reitter

(10) Patent No.: US 7,159,683 B2
(45) Date of Patent: Jan. 9, 2007

(54) MOTOR VEHICLE HAVING AN ELECTRIC SEAT ADJUSTER FOR A SEAT AND METHOD OF USING THE SAME

(75) Inventor: Christian Reitter, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 50 days.

(21) Appl. No.: 10/876,759

(22) Filed: Jun. 28, 2004

(65) Prior Publication Data

US 2005/0023814 A1    Feb. 3, 2005

(30) Foreign Application Priority Data

Jun. 27, 2003    (DE)    ................................ 103 29 013

(51) Int. Cl.
*B60R 22/48*    (2006.01)
*B60N 2/02*    (2006.01)

(52) U.S. Cl. ................... 180/268; 296/68.1; 340/457.1

(58) Field of Classification Search ................ 180/268, 180/271, 273; 296/68.1, 65.01, 65.15, 65.18; 318/468, 466; 340/457.1; 280/735; 297/344.1

See application file for complete search history.

(56) References Cited

U.S. PATENT DOCUMENTS

| | | | |
|---|---|---|---|
| 5,394,955 A | * | 3/1995 | Howard ...................... 180/273 |
| 5,670,853 A | * | 9/1997 | Bauer .......................... 318/286 |
| 5,879,024 A | * | 3/1999 | Estep .......................... 280/735 |
| 6,240,352 B1 | * | 5/2001 | McCurdy ...................... 701/45 |
| 6,255,790 B1 | * | 7/2001 | Popp et al. ................. 318/280 |
| 6,293,584 B1 | * | 9/2001 | Levine ........................ 280/735 |
| 2002/0125396 A1 | * | 9/2002 | Kume et al. ................. 248/429 |

FOREIGN PATENT DOCUMENTS

| | | |
|---|---|---|
| DE | 39 32 417 | 4/1991 |
| DE | 199 25 180 | 10/2000 |
| DE | 100 12 756 | 9/2001 |

* cited by examiner

*Primary Examiner*—David R. Dunn
(74) *Attorney, Agent, or Firm*—Crowell & Moring LLP

(57) ABSTRACT

A motor vehicle has an electric seat adjuster for a seat and an occupant protection system with a belt assigned to the seat. In the buckled condition, the belt restrains an occupant in the event of a vehicle impact. The adjusting range of the seat adjuster changed as a function of the buckling condition of the belt. In preferred arrangements, the adjusting range is limited to a narrow adjusting range if the belt is not buckled and is limited to a wide adjusting range if the belt is buckled.

25 Claims, 1 Drawing Sheet

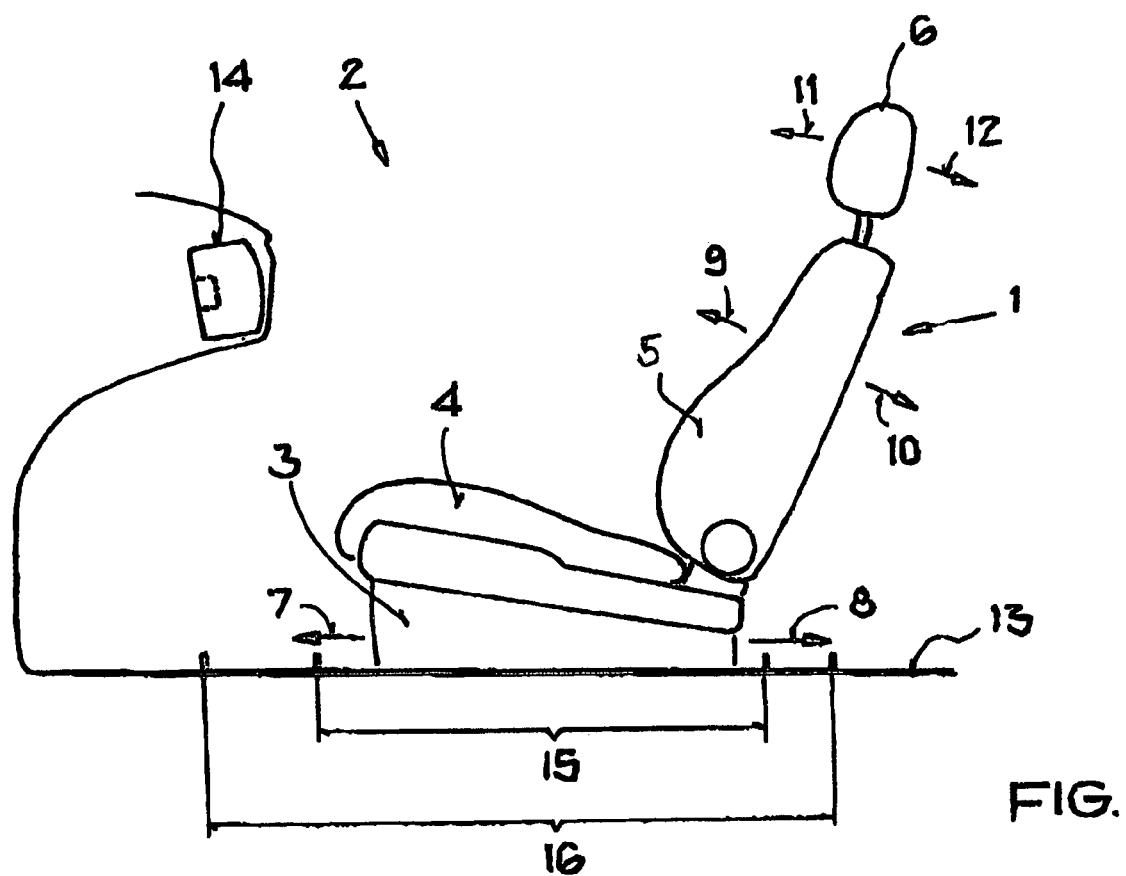
FIG.

MOTOR VEHICLE HAVING AN ELECTRIC SEAT ADJUSTER FOR A SEAT AND METHOD OF USING THE SAME

BACKGROUND AND SUMMARY OF THE INVENTION

This application claims the priority of German Application No. 103 29 013.3 filed Jun. 27, 2003, the disclosure of which is expressly incorporated by reference herein.

The invention relates to a motor vehicle having an electric seat adjuster for a seat and having an occupant protection system comprising a belt assigned to the seat, which, when buckled, restrains the occupant in the event of a vehicle compact.

From German Patent Document DE 39 32 417 A1, a restraint system for a motor vehicle is known which has a seat belt and an air bag. By means of a switching element expediently arranged in the seat belt buckle, a first output signal is emitted when the seat belt is buckled and a second output signal is emitted when the seat belt is not buckled. When the seat belt is not buckled, a time-delayed triggering of the air bag takes place. The extent of the delay depends on the respective sitting position of the occupant. For sensing the sitting position, the seat equipped with an electric seat adjusting device is also provided with a memory which records the sitting position.

In addition, German Patent Document DE 199 25 180 C1 describes a motor vehicle with a seat adjusting device having a power-operated adjusting drive. A memory unit is provided for storing defined sitting positions which, when the memory function is triggered, can be reached automatically by means of the adjusting drive.

It is now an object of the invention to provide a vehicle with an optimal occupant protection and comfort.

This object is achieved according to certain preferred embodiments of the invention by a motor vehicle comprising an electric seat adjuster for a seat, an occupant protection system comprising a belt assigned to the seat, which belt, in a buckled condition, restrains an occupant in an event of a vehicle impact, wherein as a function of the buckling condition of the belt, an adjusting range of the seat adjuster is limited to a narrow adjusting range if the belt is not buckled and is limited to a wider adjusting range if the belt is buckled.

According to the invention, as a function of the buckling condition of the belt of the occupant protection system, the adjusting range of the electric seat adjuster of the seat is limited to a narrow adjusting range when the belt is not buckled, and to a wide adjusting range when the belt is buckled. Among other factors, the requirement is thereby taken into account that the obligation to wear a seat belt does not exist in some countries. Thus, for a maximal protection, the adjusting range of the seat would have to be limited to such a narrow range that a good protective effect of the occupant protection system in the maximally rearward position of the seat is ensured also for an occupant not wearing a seat belt. By means of the solution according to the invention, comfort is increased for the occupants who are wearing a seat belt. In comparison to occupants who are not wearing seat belts, they have a larger variation range of sitting positions, in order to make a drive as comfortable as possible.

In a further development according to certain preferred embodiments of the invention, the seat is automatically moved into a position in the narrow adjusting range if, at the start of the motor vehicle, the belt is not buckled and the seat is adjusted in a position outside the narrow adjusting range. As a result, it is ensured that, for an occupant who is not buckled in at the start of a drive, the seat is moved into the narrow adjusting range already before or during the start of the drive. Since, specifically when the vehicle is entered, the buckling of the seat belt may be forgotten or intentionally not take place, the seat can in this case be moved into the narrow adjusting range advantageous for traffic safety as early as at the start of the drive. Different points in time can be defined as the start of the motor vehicle, such as a communication start of an access authorization system, an inserted ignition key, different ignition key positions, an ignition start or a point in time shortly after the ignition of the motor vehicle has taken place.

According to certain preferred embodiments of the invention, it is provided that, if the belt is unbuckled during the drive and thus the buckling condition changes from "belt is buckled" to "belt is not buckled", the seat is automatically moved from a position outside the narrow adjusting range into a position within the narrow adjusting range. As a result, a situation is taken into account in which an occupant takes off the seat belt during the drive. In this case, the moving of the seat can take place so slowly that it has no disturbing effect on the occupant, especially on an occupant sitting at the steering wheel. In addition, the movement could be acoustically, haptically or visually indicated to the occupant, so that the latter can consciously prepare himself for the moving of the seat.

As an alternative or in addition to an automatic movement of the seat into a position within the narrow adjusting range, a warning signal may be provided which indicates to the occupant that the sitting position is outside the narrow adjusting range.

Additional advantageous further developments of the invention are described herein and in the claims.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a lateral schematic view of a seat of a motor vehicle showing its adjusting positions, which is constructed according to preferred embodiments of the invention.

DETAILED DESCRIPTION OF THE DRAWINGS

The seat of a motor vehicle 2 illustrated in the FIGURE comprises a seat bucket 3 with a seat pad 4, a backrest 5 and a headrest 6. Some of the degrees of freedom of the seat 1 are indicated by arrows 7 to 12, which depict some of the possible adjusting options of the seat 1 of the motor vehicle 2 by means of an electric seat adjuster.

The seat bucket 3 is movably arranged on a body platform 13 of the motor vehicle 2, so that an adjustment of the seat 1 can take place in the direction of the longitudinal axis of the motor vehicle 2. This changes, among other things, the distance between the seat and a frontal air bag 14, which is a component of an active and passive occupant protection system which is not shown in detail and comprises additional air bags and a belt for buckling an occupant assigned to the seat 1.

As a function of the buckling condition of the belt, the adjusting range of the seat adjuster is limited to a narrow adjusting range 15 when the belt is not buckled, and is limited to a wide adjusting range 16 when the belt is buckled. The narrow adjusting range 15 for the unbuckled condition is contained in the wide adjusting range 16 for the buckled condition. The size and the position of the narrow adjusting range 15 relative to the wide adjusting range 16 depend on the respective motor vehicle model. A narrow adjusting range 15 and a wide adjusting range 16 respectively may also be provided for the other adjusting options of the seat 1, for example, for adjusting the backrest 5 or the headrest 6.

If the belt has not been buckled at the start of the motor vehicle 2 and the seat 1 is adjusted in a position of the wide adjusting range 16 outside the narrow adjusting range 15, the seat 1 is automatically moved into a position in the narrow adjusting range 15.

By buckling the belt before adjusting the seat, the wide adjusting range 16 is available to the occupant to an unlimited degree.

If the belt is unbuckled during the driving operation—the buckling condition changes from "belt is buckled" to "belt is not buckled"—, the seat 1 can also automatically be moved from a position outside the narrow adjusting range 15 into a position in the narrow adjusting range 15. In one embodiment, the seat 1 can be moved from a position outside the narrow adjusting range 15 into a position within the narrow adjusting range 15 only above a predefined low minimal speed of, for example, 20 km/h, of the motor vehicle 2. As a result, the wide adjusting range 16 for the seat 1 is, for example, available for parking maneuvers.

In this case, the seat 1 should be moved so slowly that the moving of the seat 1 does not disturb or distract the occupant during his steering operation. In addition, the moving of the seat 1 can be indicated to the occupant acoustically, haptically or visually in order to inform the occupant of the seat adjustment and not surprise him.

In another advantageous embodiment, it is provided that, after the stoppage of the motor vehicle 2 and after the occupant has left the motor vehicle 2, the seat 1 is automatically moved into a position within the narrow adjusting range 15. Thus, it is ensured that, when the operation of the motor vehicle 2 is then started, the seat is first positioned within the narrow adjusting range 15 and a moving of the seat 1 into a position outside the narrow adjusting range 15 becomes possible only when the occupant buckles his seat belt.

Several advantages are achieved by means of this automated seat adjustment. The seat adjusting field is basically not limited but only in those cases where it is required by safety considerations, specifically in an unbuckled condition. This results in an increase of comfort for an occupant who, in the buckled condition, can utilize all adjusting options of the seat 1 and, in the unbuckled condition, is immediately moved together with his seat 1 into a position which is optimized with respect to safety.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle comprising:
   an electric seat adjuster for a seat, and
   an occupant protection system comprising a belt assigned to the seat, which belt, in a buckled condition, restrains an occupant in an event of a vehicle impact,
   wherein, an adjusting range of the seat adjuster, which adjusting range limits an extent of adjustment of the position of said vehicle seat by said occupant, is limited to a narrow adjusting range if the belt is not buckled and is limited to a wider adjusting range if the belt is buckled.

2. Motor vehicle according to claim 1, wherein, if, at a start of the motor vehicle, the belt is not buckled and the seat is adjusted in a position outside the narrow adjusting range, the seat is automatically moved into a position within the narrow adjusting range and/or a warning signal is emitted.

3. Motor vehicle according to claim 1, wherein, if the belt is opened up during the driving operation and thus the buckling condition changes from "belt is buckled" to "belt is not buckled", the seat automatically moves from a position outside the narrow adjusting range into a position within the narrow adjusting range and/or a warning signal is emitted.

4. Motor vehicle according to claim 2, wherein the seat can be moved from a position outside the narrow adjusting range to a position within the narrow adjusting range only above a predefined minimal speed of the motor vehicle.

5. Motor vehicle according to claim 3, wherein the seat is moved automatically from a position outside the narrow adjusting range to a position within the narrow adjusting range only above a predefined minimal speed of the motor vehicle.

6. Motor vehicle according to claim 2, wherein the seat is moved so slowly into the narrow adjusting range that the moving of the seat is perceived by the occupant as not being disturbing or is almost not perceived.

7. Motor vehicle according to claim 3, wherein the seat is moved so slowly into the narrow adjusting range that the moving of the seat is perceived by the occupant as not being disturbing or is almost not perceived.

8. Motor vehicle according to claim 2, wherein the moving of the seat is acoustically, haptically or visually indicated to the occupant.

9. Motor vehicle according to claim 3, wherein the moving of the seat is acoustically, haptically or visually indicated to the occupant.

10. Motor vehicle according to claim 1, wherein a narrow adjusting range and a wide adjusting range are provided for at least one electrically adjustable component of the seat.

11. Motor vehicle according to claim 2, wherein a narrow adjusting range and a wide adjusting range are provided for at least one electrically adjustable component of the seat.

12. Motor vehicle according to claim 1, wherein the seat is automatically moved into a position within the narrow adjusting range after the stoppage of the motor vehicle and after the occupant has left the motor vehicle.

13. A vehicle seat assembly comprising:
    a vehicle seat;
    a seat belt assigned to the seat and operable in a buckled condition to restrain a seat occupant during a vehicle impact event;
    a seat adjuster for adjusting the position of said vehicle seat; and
    a seat adjuster controller operable by a seat occupant to control adjustment of the vehicle seat by said seat adjuster;
    wherein an adjusting range, which limits an extent of possible adjustment of said vehicle seat by said seat occupant, is varied as a function of whether the seat belt is buckled or unbuckled.

14. An assembly according to claim 13, wherein the seat adjuster controller is operable to change the adjusting range between a predetermined narrow range and a predetermined wider range.

15. An assembly according to claim 14, wherein the seat adjuster is operable to adjust a spacing between a vehicle airbag and the seat, and
   wherein the seat adjuster changes to the narrow range when the belt is unbuckled.

16. An assembly according to claim 14, wherein the adjuster is operable to adjust a plurality of seat components,
   wherein the seat adjuster is operable to adjust a spacing between a vehicle airbag and at least one of said seat components.

17. An assembly according to claim 16, wherein the seat adjuster changes to the narrow range when the belt is unbuckled.

18. An assembly according to claim 15, comprising warning means for providing a warning signal when the narrow range is selected by the seat adjuster controller.

19. An assembly according to claim 17, comprising warning means for providing a warning signal when the narrow range is selected by the seat adjuster controller.

20. An assembly according to claim 14, wherein, if the belt is opened up during the driving operation and thus the buckling condition changes from "belt is buckled" to "belt is not buckled", the seat automatically moves from a position outside the narrow adjusting range into a position within the narrow adjusting range and/or a warning signal is emitted.

21. An assembly according to claim 14, wherein the seat can be moved from a position outside the narrow adjusting range to a position within the narrow adjusting range only above a predefined minimal speed of the motor vehicle.

22. An assembly according to claim 14, wherein the seat is moved so slowly into the narrow adjusting range that the moving of the seat is perceived by the occupant as not being disturbing or is almost not perceived.

23. An assembly according to claim 14, wherein the moving of the seat is acoustically, haptically or visually indicated to the occupant.

24. An assembly according to claim 14, wherein the seat is automatically moved into a position within the narrow adjusting range after the stoppage of the motor vehicle and after the occupant has left the motor vehicle.

25. A method of operating a vehicle seat assembly comprising:
   a vehicle seat;
   a seat belt assigned to the seat an operable in a buckled condition to restrain a seat occupant during a vehicle impact event;
   a seat adjuster for adjusting the position of said seat; and
   a seat adjuster controller operable by an occupant of said vehicle seat to control adjustment of the vehicle seat by said seat adjuster; wherein
   an adjusting range, which limits an extent of possible adjustment of said vehicle seat by said seat occupant, is varied as a function of whether the seat belt is buckled or unbuckled; and
   said method including automatically changing the adjusting range from a wider to a narrower adjusting range whenever the belt is changed from a buckled state to an unbuckled state.

* * * * *